3,845,103
N,N - DISUBSTITUTED - N'-[(N"-ALKYL-N"-TRI-HALO-METHYLSULFENYL-CARBAMOYLOXY)-PHENYL]-FORMAMIDINES
Gerhard Zumach, Cologne, Engelbert Kuhle, Bergisch Gladbach, and Ingeborg Hammann, Cologne, Germany, assignors to Bayer Aktiengesellschaft, Leverkusen, Germany
No Drawing. Filed Mar. 14, 1972, Ser. No. 234,666
Claims priority, application Germany, Mar. 19, 1971, P 21 13 299.0
Int. Cl. C07c 125/06
U.S. Cl. 260—479 C    4 Claims

ABSTRACT OF THE DISCLOSURE

N,N - disubstituted - N' - [(N"-alkyl-N"-trihalomethyl-sulfenyl - carbamoyloxy) - phenyl] - formamidines of the general formula

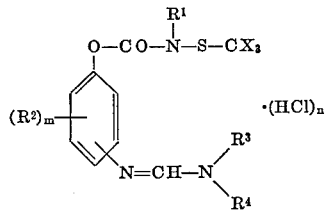

in which
m is 0, 1 or 2,
n is 0 or 1;
$R^1$ is lower alkyl,
$R^2$ is lower alkyl or halogen,
$R^3$ and $R^4$ each is lower alkyl or lower alkenyl or, together with the nitrogen atom to which they are attached, form a saturated heterocyclic ring that optionally contains one or more further hetero atoms, and
X is fluorine, chlorine or bromine, each X being selected independently of the others,
which possess insecticidal and acaricidal properties.

---

The present invention relates to and has for its objects the provision of particular new N,N - disubstituted - N'- [(N" - alkyl - N" - trihalomethylsulfenyl - carbamoyl)- phenyl]-formamidines which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known from German Published Specification No. 1,169,194 that N - methyl - carbamates of formamidino-phenols display insecticidal and acaricidal activity, e.g. the N - methyl carbamate of N,N - dimethyl - $N^1$ - (3-hydroxyphenyl) - formamidine (Compound A) or its hydrochloride (Compound B).

The present invention provides, as new compounds, N-sulfenylated carbamates of the general formula

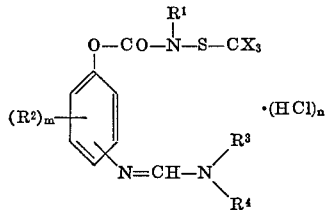

in which
m is 0, 1 or 2,
n is 0 or 1,
$R^1$ is lower alkyl,
$R^2$ is lower alkyl or halogen,
$R^3$ and $R^4$ each is lower alkyl or lower alkenyl or, together with the nitrogen atom to which they are attached, form a saturated heterocyclic ring that optionally contains one or more further hetero-atoms, and
X is fluorine, chlorine or bromine, each X being selected independently of the others.

In the above formula, $R^2$ is preferably alkyl with 1 to 4 carbon atoms (especially methyl), chlorine or bromine. Preferably, $R^3$ and $R^4$ are each alkyl or alkenyl, with up to 4 carbon atoms in either case, or, together with nitrogen atom to which they are shown attached, form a 5-, 6- or 7-membered saturated heterocyclic ring that optionally contains an oxygen, sulfur or further nitrogen atom.

The compounds of the formula (I) above are distinguished by strong insecticidal and acaricidal properties. It is distinctly surprising that the compounds according to the present invention display a higher insecticidal and acaricidal potency than the known formamidinophenyl-N-methyl-carbamates. The compounds according to the invention hence represent an enrichment of the art.

The present invention also provides a process for the preparation of an N-sulfenylated carbamate of the formula (I) in which a formamidinophenol of the general formula

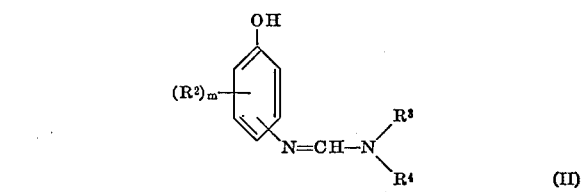

is reacted, in the presence of an acid-binding agent or in the form of an alkali metal formamidinophenolate, with an N-sulfenylated N-alkylcarbamic acid fluoride of the general formula

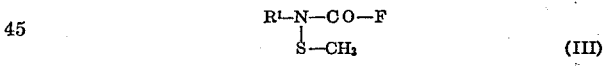

the reaction optionally being effected in the presence of a diluent, and the product so obtained is converted, if required, into its hydrochloride; in the above formulas (II) and (III) $R^1$, $R^2$, $R^3$, $R^4$, X and m have the meanings stated above.

If N-(3-hydroxyphenyl) - N,N - dimethylformamidine and N-dichlorofluoromethylmercapto - N-methylcarbamic acid fluoride are used as the starting materials, the course of the reaction can be represented by the following equation:

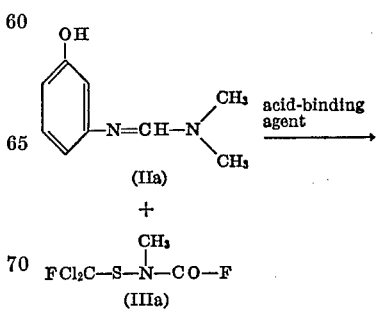

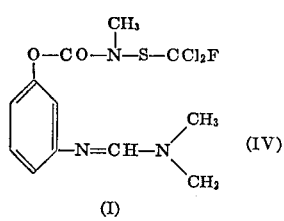

The N-sulfenylated N-alkylcarbamic acid fluorides of the formula (III) to be used for the reaction are known. As described in Belgian Patent Specification No. 717,705 they are obtainable from N-alkylcarbamic acid fluorides and the appropriate sulfenyl chlorides, which have also been described in the literature, in the presence of a tertiary amine.

A number of the formamidinophenols of the formula (II) to be used for the reaction are known; all of the formamidinophenols, however, can be manufactured in known manner as described in German Published Specification No. 1,169,194 and United States Patent No. 3,184,482.

Examples of the formamidinophenols that can be used in accordance with the present invention are:

N,N-dimethyl-N'-(2-hydroxyphenyl)-formamidine,
N,N-dimethyl-N'-(2-hydroxy-5-methylphenyl)-formamidine,
N,N-dimethyl-N'-(3-hydrozyphenyl-formamidine,
N,N-dimethyl-N'-(5-hydroxy-2-methylphenyl)-formamidine,
N,N-dimethyl-N'-(5-hydroxy-4-methylphenyl)-formamidine,
N,N-dimethyl-N'-(2,4-dimethyl-5-hydroxyphenyl)-formamidine,
N,N-dimethyl-N'-(5-hydroxy-4-isopropylphenyl)-formamidine,
N,N-dimethyl-N'-(4-sec.-butyl-5-hydroxyphenyl)-formamidine,
N,N-dimethyl-N'-(5-hydroxy-4-isopropyl-2-methylphenyl)-formamidine,
N,N-dimethyl-N'-(2-chloro-5-hydroxyphenyl)-formamidine,
N,N-dimethyl-N'-(4-chloro-5-hydroxyphenyl)-formamidine,
N,N-dimethyl-N'-(2,4-dichloro-5-hydroxyphenyl)-formamidine,
N,N-dimethyl-N'-(4-bromo-5-hydroxyphenyl)-formamidine,
N,N-diethyl-N'-(3-hydroxyphenyl)-formamidine,
N,N-diethyl-N'-(5-hydroxy-2-methylphenyl)-formamidine,
N,N-dipropyl-N'-(3-hydroxyphenyl)formamidine,
N,N-diisopropyl-N'-(3-hydroxyphenyl)-formamidine,
N,N-dibutyl-N'-(3-hydroxyphenyl)-formamidine,
N,N-dibutyl-N'-(5-hydroxy-2-methylphenyl)-formamidine,
N,N-dibutyl-N'-(2-chloro-5-hydroxyphenyl)-formamidine,
N,N-diallyl-N'-(3-hydroxyphenyl)-formamidine
N,N-diallyl-N'-(5-hydroxy-2-methylphenyl)-formamidine,
N,N-diallyl-N'-(4-chloro-5-hydroxyphenyl)-formamidine,
N,N-tetramethylene-N'-(3-hydroxyphenyl)formamidine,
N,N-tetramethylene-N'-(5-hydroxy-2-methylphenyl)-formamidine,
N,N-pentamethylene-N'-(3-hydroxyphenyl)-formamidine,
N,N-hexamethylene-N'-(3-hydroxyphenyl)-formamidine,
N-methyl-N'-(3-hydroxyphenyliminomethyl)-piperazine,
N-(3-hydroxyphenyliminomethyl)-morpholine,
N-(3-hydroxyphenyliminomethyl)-thiomorpholine,
N,N-dimethyl-N'-(4-hydroxyphenyl)-formamidine,
N,N-dimethyl-N'-(4-hydroxy-2-methylphenyl)formamidine,
N,N-dimethyl-N'-(2,6-dimethyl-4-hydroxyphenyl)-formamidine,
N,N-dimethyl-N'-(4-hydroxy-5-isopropyl-2-methylphenyl)-formamidine,
N,N-dimethyl-N'-(4-hydroxy-2-isopropyl-5-methylphenyl)-formamidine,
N,N-dimethyl-N'-(4-hydroxy-2-isopropyl-6-methylphenyl)-formamidine,
N,N-dimethyl-N'-(4-hydroxy-2-isobutylphenyl)-formamidine,
N,N-dimethyl-N'-(3-chloro-4-hydroxyphenyl)-formamidine,
N,N-dimethyl-N'-(3-bromo-4-hydroxyphenyl)-formamidine,
N,N-diethyl-N'-(4-hydroxyphenyl)-formamidine,
N,N-dipropyl-N'-(4-hydroxyphenyl)-formamidine,
N,N-diisopropyl-N'-(4-hydroxyphenyl)-formamidine,
N,N-dibutyl-N'-(4-hydroxyphenyl)-formamidine,
N,N-diallyl-N'-(4-hydroxyphenyl)-formamidine,
N,N-tetramethylene-N'-(4-hydroxyphenyl)-formamidine,
N,N-pentamethylene-N'-(4-hydroxyphenyl)-formamidine,
N-methyl-N'-(4-hydroxyphenyliminomethyl)-piperazine,
N-(4-hydroxyphenyliminomethyl)-morpholine
and N-(4-hydroxyphenyliminomethyl)-thiomorpholine.

The N-sulfenylated carbamates of this invention are preferably prepared in the presence of a diluent, which term, of course, includes a solvent. When working with solvents, those which do not react with the N-sulfenylated N-alkylcarbamic acid fluorides, or only react slowly with them, are preferably used. As examples of such solvents there may be mentioned hydrocarbons, which may be chlorinated, such as benzene, toluene, methylene chloride, dichloroethanes, chloroform, chlorobenzene and dichlorobenzenes; ethers, such as diethyl ether, tetrahydrofuran and dioxane; and mixtures of such solvents.

In order to bind the hydrogen fluoride produced in the reaction, an acid-binding agent, preferably a tertiary base such as triethylamine or an inorganic base such as an alkali metal hydroxide or an alkali metal carbonate, is added to the reaction mixture. It is also possible to start directly from the appropriate alkali metal formamidinophenolate and to carry out the reaction in an aqueous phase.

The reaction temperatures can be varied over a fairly wide range. In general, the process is carried out at from about 0° to 100° C., preferably at from about 20° to 40° C. The reactants are usually employed in about equimolar amounts.

The active substances according to the invention show strong insecticidal and acaricidal properties coupled with low phytotoxicity. The active substances can therefore be used with good success for combating harmful sucking and biting insects, Diptera as well as mites (Acarina). For these reasons, the compounds of this invention may be used as insecticides and acaricides in the field of plant protection.

To the sucking insects contemplated herein there belong, in the main, aphids (Aphidae) such as the green peach aphid (Myzus persicae), the bean aphid (Doralis fabae), the bird cherry aphid (Rhopalosiphum padi), the pea aphid (*Macrosiphur pisi*) and the potato aphid (*Macrosiphum solanfolii*), and the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealy bugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*) such as Hercinothrips femoralis, and bugs, for example the beet bug (*Piesma quadrata*), the red cotton bug (*Dystercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*, and the like.

In the case of the biting insects contemplated herein, above all there should be mentioned butterfly caterpillars (*Lepidoptera*) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (*Coleoptera*), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the sawtoothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta;* further, Orthoptera, for example the house cricket (*Acheta domesticus*); termites such as the eastern subterranean termit (*Reticulitermes flavipes*) and Hymenoptera such as ants, for example the garden ant (*Lasius niger*); and the like.

The *Diptera* contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (*Acari*) contemplated herein there are classed, in particular, the spider mites (*Tetranychidae*) such as the two-spotted spider mite (*Tetranychus telarius =Tetranychus althaeae* or *Tetranychus urticae*) and the European red mite (*Paratetranychus pilosus=Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relasping fever tick (*Ornithodorus moubata*); and the like.

When applied against hygiene pests and pests of stored products, particularly flies and mosquitoes, the compounds of the invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.) cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolin, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides or rodenticides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra low volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE A

Phaedon larvae test

Solvent: 3 parts by weight dimethyl formamide
Emulsifier: 1 part by weight alkylarylpolyglycol ether To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified period of time, the degree of destruction is determined as a percentage: 100% means that all the beetle larvae are killed. 0% means that none of the beetle larvae are killed.

The active compounds, the concentration of the active compounds, the time of evaluation and the results can be seen from the following Table 1.

TABLE 1.—Plant-Damaging Insects
*Phaedon* larvae test

| Active compounds | Concentration of active compound in percent | Degree of destruction in percent after 3 days |
|---|---|---|
| (A) O—CO—NH—CH₃ / phenyl-N=CH—N(CH₃)₂ (known) | 0.2<br>0.02<br>0.002 | 100<br>100<br>0 |
| (3) O—CO—N(CH₃)—S—CF₃ / phenyl-N=CH—N(CH₃)₂ | 0.2<br>0.02<br>0.002 | 100<br>100<br>70 |
| (1) O—CO—N(CH₃)—S—CCl₂F / phenyl-N=CH—N(CH₃)₂ | 0.2<br>0.02<br>0.002 | 100<br>100<br>40 |

EXAMPLE B

Myzus test (contact action)

Solvent: 3 parts by weight dimethyl formamide
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified period of time, the degree of destruction is determined as a percentage: 100% means that all the aphids are killed whereas 0% means that none of the aphids are killed.

TABLE 2.—plant-damaging insects
*Myzus* test

| Active compounds | Concentration of active compound in percent | Degree of destruction in percent after one day |
|---|---|---|
| (A) O—CO—NH—CH₃ / phenyl-N=CH—N(CH₃)₂ (known) | 0.2<br>0.02<br>0.002 | 100<br>60<br>0 |
| (3) O—CO—N(CH₃)—S—CF₃ / phenyl-N=CH—N(CH₃)₂ | 0.2<br>0.02<br>0.002 | 100<br>90<br>30 |

TABLE 2—Continued

| Active compounds | Concentration of active compound in percent | Degree of destruction in percent after on day |
|---|---|---|
| O—CO—N(CH₃)—S—CCl₂F, phenyl-N=CH—N(CH₃)₂ (1) | 0.2 / 0.02 / 0.002 | 100 / 100 / 80 |
| O—CO—NH—CH₃, phenyl-N=CH—N(CH₃)₂ ·HCl (B) (known) | 0.2 / 0.02 / 0.002 | 100 / 90 / 40 |
| O—CO—N(CH₃)—S—CCl₂F, phenyl-N=CH—N(CH₃)₂ ·HCl (4) | 0.2 / 0.02 / 0.002 | 100 / 100 / 50 |

EXAMPLE C

Tetranychus test/resistant

Solvent: 3 parts by weight dimethyl formamide
Emulsifier: 1 part by weight alkylarylpolyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with the two-spotted spider mite (*Tetranychus urticae*) in all stages of development.

After the specified period of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation time and the results can be seen from the following Table 3.

TABLE 3.—plant-damaging mites
*Tetranychus* test

| Active compounds | Concentration of active compound in percent | Degree of destruction in percent after 2 days |
|---|---|---|
| O—CO—NH—CH₃, phenyl-N=CH—N(CH₃)₂ (A) (known) | 0.2 / 0.02 / 0.002 | 100 / 95 / 20 |
| O—CO—N(CH₃)—S—CCl₂F, phenyl-N=CH—N(CH₃)₂ (1) | 0.2 / 0.02 / 0.002 | 100 / 100 / 90 |

TABLE 3—Continued

| Active compounds | Concentration of active compound in percent | Degree of destruction in percent after 2 days |
|---|---|---|
| O—CO—NH—CH₃, phenyl-N=CH—N(CH₃)₂ ·HCl (B) (known) | 0.2 / 0.02 / 0.002 | 100 / 85 / 0 |
| O—CO—N(CH₃)—S—CF₃, phenyl-N=CH—N(CH₃)₂ ·HCl (6) | 0.2 / 0.02 | 100 / 100 |
| O—CO—N(CH₃)—S—CCl₂F, phenyl-N=CH—N(CH₃)₂ ·HCl (4) | 0.2 / 0.02 | 100 / 100 |

The preparative process of the present invention is illustrated in and by the following Examples.

EXAMPLE 1

O—CO—N(CH₃)—S—CCl₂F, phenyl-N=CH—N(CH₃)₂ (1)

48 g. (0.23 mole) of N-dichlorofluoromethylmercapto-N-methylcarbamic acid fluoride followed by 20 g. of triethylamine are added dropwise, at room temperature, to a suspension of 33 g. (0.2 mole) of N,N-dimethyl-N'-(3-hydroxyphenyl)formamidine in 300 ml. of dioxane. When the weakly exothermic reaction has subsided, the mixture is stirred for a further hour at room temperature and subsequently for 30 minutes at 60° to 70° C., and is then cooled and poured into 700 ml. of ice-water. The oil that precipitates is taken up in methylene chloride and washed with water. After drying the solution and evaporating off the methylene chloride, 59 g. of the above compound (1) are obtained as a red-brown oil, $n_D^{20}$ 1.5799.

The following are obtained in a manner analogous to that above:

(2) O—CO—N(CH₃)—S—CCl₃, phenyl-N=CH—N(CH₃)₂

Oil, $n_D^{20}$ 1.5719

(3) O—CO—N(CH₃)—S—CF₃, phenyl-N=CH—N(CH₃)₂

Oil, $n_D^{20}$ 1.5434

EXAMPLE 2

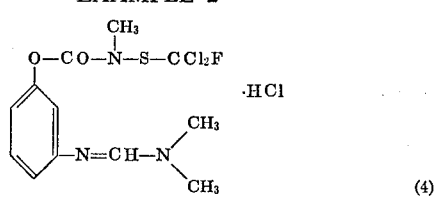

56 g. (0.158 mole) of the formamidine obtained according to Example 1 are dissolved in 400 ml. of ether. Dry hydrogen chloride is introduced into the solution until the precipitation is complete and the precipitate is then filtered off, rinsed with ether and dried in air. 54 g. of the above compound (4), of melting point 163° to 165° C., are obtained as colourless crystals.

The following are obtained in a manner analogous to that above:

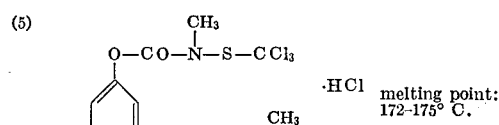

melting point: 172–175° C.

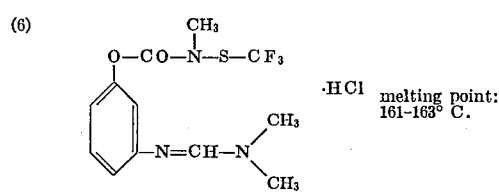

melting point: 161–163° C.

EXAMPLE 3

35 g. (0.165 mole) of N-dichlorofluoromethylmercapto-N-methylcarbamic acid fluoride dissolved in 30 ml. of dioxane, are added dropwise at 10–15° C. to a solution of 25 g. (0.15 mole) of N,N-dimethyl - N' - (3-hydroxyphenyl)formamidine and 6 g. of sodium hydroxide in 300 ml. of water. The mixture is stirred for 1 hour at room temperature, the resulting oil is taken up in methylene chloride, and the organic phase is washed twice with water, dried and evaporated. 43 g. of the compound of the formula (1) are obtained.

It will be appreciated that the instant specification and examples are set forth by way of illustration and not limitation, and that various modifications and changes may be made without departing from the spirit and scope of the present invention.

What is claimed is:

1. An N-sulfenylated carbamate of the formula

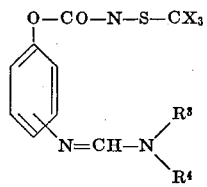

in which $R^3$ and $R^4$ each is alkyl or alkenyl with up to 4 carbon atoms or together with the nitrogen atom to which they are attached are a piperazine, morpholine or thiomorpholine ring, and X is fluorine or chlorine.

2. The compound according to claim 1 wherein such compound is N,N - dimethyl - N' - [3-(N''-methyl-N''-dichlorofluoromethylmercapto - carbamoyloxy) - phenyl]-formamidine of the formula

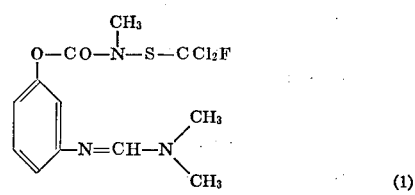

or its hydrochloride.

3. The compound according to claim 1 wherein such compound is N,N - dimethyl - N' - [3-(N''-methyl-N''-trichloromethylmercapto - carbamoyloxy) - phenyl]-formamidine of the formula

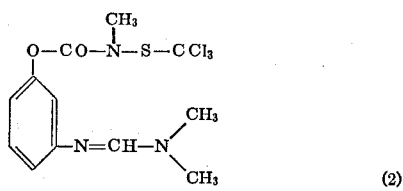

or its hydrochloride.

4. The compound according to claim 1 wherein such compound is N,N - dimethyl - N' - [3-(N''-methyl-N''-trifluoromethylmercapto - carbamoyloxy) - phenyl] - formamidine of the formula

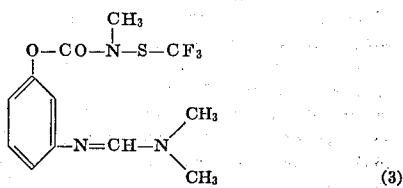

or its hydrochloride.

References Cited

UNITED STATES PATENTS

| | | | |
|---|---|---|---|
| 3,542,853 | 11/1970 | Peissker et al. | 260—479 |
| 3,344,153 | 9/1967 | Kuhle et al. | 260—347.2 |

FOREIGN PATENTS

| | | |
|---|---|---|
| 1,493,581 | 7/1967 | France. |

JAMES A. PATTEN, Primary Examiner

U.S. Cl. X.R.

260—239 BF, 243 B, 247.1, 268 R, 293.73, 326.12; 424—246, 248, 250, 267, 274, 300